(12) United States Patent
Kim et al.

(10) Patent No.: US 8,826,671 B2
(45) Date of Patent: Sep. 9, 2014

(54) CONTROL SYSTEM FOR A GAS TURBINE POWER PLANT

(75) Inventors: Eunkyeong Kim, Hitachi (JP); Kazuhito Koyama, Hitachi (JP); Shigeo Hatamiya, Hitachi (JP); Yukinori Katagiri, Hitachi (JP); Takuya Yoshida, Mito (JP); Naohiro Kusumi, Hitachinaka (JP); Kazuo Takahashi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/983,140

(22) PCT Filed: Feb. 4, 2011

(86) PCT No.: PCT/JP2011/052422
§ 371 (c)(1),
(2), (4) Date: Oct. 11, 2013

(87) PCT Pub. No.: WO2012/105053
PCT Pub. Date: Aug. 9, 2012

(65) Prior Publication Data
US 2014/0033720 A1 Feb. 6, 2014

(51) Int. Cl.
*F02C 3/30* (2006.01)
*F02C 9/00* (2006.01)
*F02C 9/20* (2006.01)
*F02C 7/143* (2006.01)

(52) U.S. Cl.
CPC ... *F02C 9/00* (2013.01); *F02C 9/20* (2013.01); *F02C 3/30* (2013.01); *F02C 7/1435* (2013.01)
USPC .......................................... 60/775

(58) Field of Classification Search
USPC ........ 60/39.23, 39.3, 39.53, 728, 775, 39.281
See application file for complete search history.

(56) References Cited

U.S. PATENT DOCUMENTS 5,463,873 A * 11/1995 Early et al. ............. 62/121
6,260,350 B1 7/2001 Horii et al.
(Continued)

FOREIGN PATENT DOCUMENTS

JP 3-258928 A 11/1991
JP 5-256166 A 10/1993
(Continued)

OTHER PUBLICATIONS

International Search Report dated May 10, 2011 w/ partial English translation (five (5) pages).
(Continued)

*Primary Examiner* — Phutthiwat Wongwian
(74) *Attorney, Agent, or Firm* — Crowell & Moring LLP

(57) ABSTRACT

A controller for use in a gas turbine power plant includes a compressor that compresses combustion air; a water-atomization cooling apparatus that sprays water drops of atomized water supplied via a water-atomization flow-rate regulating valve over a flow of air drawn in the compressor; a combustor that mixes the compressed combustion air with fuel to thereby burn a fuel-air mixture and generate combustion gas at high temperature and performs combustion switching during operation; a turbine that uses the combustion gas to drive the compressor and a generator; the water-atomization flow-rate regulating valve that controls a flow rate of the atomized water; and a compressor inlet inner blade that controls a flow rate of air drawn in the compressor. The controller includes control means that calculates a fuel-air ratio correction command signal for compensating for reduction in a fuel-air ratio in the combustor occurring during the combustion switching.

4 Claims, 6 Drawing Sheets

(56) References Cited

U.S. PATENT DOCUMENTS

| | | |
|---|---|---|
| 6,378,284 B1 | 4/2002 | Utamura |
| 6,478,289 B1 * | 11/2002 | Trewin ............................ 261/27 |
| 6,615,585 B2 * | 9/2003 | Tsuji ............................... 60/728 |
| 8,469,588 B2 * | 6/2013 | Chillar et al. ................. 374/124 |
| 2002/0083712 A1 * | 7/2002 | Tomlinson et al. ............. 60/775 |
| 2004/0011041 A1 | 1/2004 | Inoue et al. |
| 2006/0137356 A1 * | 6/2006 | Jimenez Haertel et al. .... 60/775 |
| 2006/0201132 A1 * | 9/2006 | Hirayama et al. ........... 60/39.27 |
| 2007/0163264 A1 * | 7/2007 | Diaz et al. ....................... 60/775 |
| 2008/0060345 A1 | 3/2008 | Nakano et al. |
| 2013/0174549 A1 * | 7/2013 | Sediai et al. .................. 60/641.8 |

FOREIGN PATENT DOCUMENTS

| | | |
|---|---|---|
| JP | 7-225024 A | 8/1995 |
| JP | 8-270407 A | 10/1996 |
| JP | 9-236024 A | 9/1997 |
| JP | 11-72029 A | 3/1999 |
| JP | 11-343869 A | 12/1999 |
| JP | 2000-257443 A | 9/2000 |
| JP | 2003-74854 A | 3/2003 |
| JP | 2005-511947 A | 4/2005 |
| JP | 2007-107464 A | 4/2007 |
| JP | 2008-64014 A | 3/2008 |
| JP | 2010-25069 A | 2/2010 |
| WO | WO 03/048544 A1 | 6/2003 |

OTHER PUBLICATIONS

Japanese-language Written Opinion (PCT/ISA/237) (four (4) pages), May 10, 2011.

* cited by examiner

----- RELATED ART
——— FUEL-AIR RATIO COMPENSATION CONTROL PERFORMED

---- RELATED ART
········ FUEL-AIR RATIO COMPENSATION CONTROL PERFORMED ONLY FOR WATER ATOMIZATION FLOW RATE
—— FUEL-AIR RATIO COMPENSATION CONTROL PERFORMED BOTH FOR WATER ATOMIZATION FLOW RATE AND AIR FLOW RATE

CONTROL SYSTEM FOR A GAS TURBINE POWER PLANT

TECHNICAL FIELD

The present invention relates to a controller for a gas turbine power plant including a compressor, a combustor, a turbine, and a generator.

BACKGROUND ART

A gas turbine power plant generally includes a compressor that compresses combustion air, a combustor that mixes the compressed combustion air with gas turbine fuel (hereinafter referred to as fuel) to thereby burn a fuel-air mixture and generate combustion gas at high temperature, and a turbine that uses the combustion gas to drive the compressor and a generator.

A pre-mixed combustion system that mixes air with fuel in advance of combustion is employed as a fuel control system for such a gas turbine power plant in order to reduce nitrogen oxide emissions produced in the combustor. In the pre-mixed combustion system, the combustor is configured to include a plurality of burners and fuel systems. By using these burners and fuel systems, a pre-mixed combustion portion of the combustor is divided into a plurality of sub-portions to thereby increase or decrease the number of active combustion portions according to operating load. Specifically, a known method (combustion switching) uses one fuel system at starting to allow part of the burners to burn fuel; as a fuel flow rate thereafter increases, the number of fuel systems used is increased and the burners yet to be ignited are ignited in sequence, thereby increasing the number of active combustion portions (see, for example, Patent Document 1).

Another known arrangement includes a water atomization cooling apparatus disposed at an inlet to a compressor. The water atomization cooling apparatus sprays water drops over the combustion air in order to improve an output and efficiency of the gas turbine power plant (see, for example, Patent Document 2). Spraying water drops over the combustion air improves the output thanks to a reduced air temperature and an increased air flow rate on one hand; but, on the other hand, a reduced fuel-air ratio results immediately after the start of water drop spraying, which increases a risk of misfire in the combustor. The water atomization cooling apparatus is therefore started after the gas turbine power plant enters a rated operation mode (see, for example, Patent Documents 3 and 4).

PRIOR ART DOCUMENTS

Patent Documents

Patent Document 1: JP-H11-343869-A
Patent Document 2: JP-H9-236024-A
Patent Document 3: JP-H11-72029-A
Patent Document 4: JP-2005-511947-A

SUMMARY OF THE INVENTION

Problem to be Solved by the Invention

In combustion switching at starting, as the fuel flow rate increases, a new fuel system is added in order to distribute the fuel flow rate. This results in a decreased fuel flow rate supplied to the fuel system originally in use. It is known that, at combustion switching, a ratio of fuel flow rate to air flow rate (fuel-air ratio) is reduced, causing a combustion state to be unsteady and a risk of misfire in the combustor to increase.

The reduction in the fuel-air ratio involved in combustion switching at starting will be described below with reference to FIGS. 9 to 12. FIG. 9 is a characteristic diagram depicting a speed characteristic (upper diagram), a generator load characteristic (middle diagram), and a fuel flow rate characteristic (lower diagram) of the related-art gas turbine power plant. FIG. 10 is a cross-sectional view showing an arrangement of burners that constitute the combustor of the related-art gas turbine power plant. FIG. 11 is a characteristic diagram showing the fuel flow rate of each burner relative to gas turbine load in the related-art gas turbine power plant. FIG. 12 is a characteristic diagram depicting a fuel flow rate characteristic (upper diagram) at combustion switching and a fuel-air ratio characteristic (lower diagram) at combustion switching in the related-art gas turbine power plant.

As shown in FIG. 9, after the speed increases to a rated speed (at time Tn in the figure), the gas turbine power plant increases load on the generator and shifts into a rated operation mode (at time Tf in the figure). The fuel flow rate supplied to the combustor increases with the increase in the load on the generator during a period of time that begins with the time Tn at which the rated speed is reached and the time Tf at which the gas turbine power plant shifts into the rated operation mode.

As shown in FIG. 10, the combustor includes a plurality of burners (a, b1, b2, b3, b4 in the figure). Fuel is supplied to each of the burners from a corresponding fuel supply system. To start the gas turbine power plant, only one fuel supply system is used and part of the burners is ignited for combustion. The number of fuel supply systems to be used is increased as the fuel flow rate thereafter increases and, at the same time, the burners yet to be ignited are ignited in sequence. A series of such operations is called the combustion switching. Specifically, as shown, for example, from the left to right in FIG. 10, the number of fuel supply systems to be used is increased, while the burners yet to be ignited are ignited in order of [a]->[a, b1]->[a, b1, b2]->[a, b1 to b3]->[a, b1 to b4].

In such combustion switching at starting, the fuel system to be used for distributing the fuel flow rate (the fuel supply system to be used) is added as the total fuel flow rate increases, as shown in FIG. 11. This results in a decreased fuel flow rate supplied to the fuel system originally in use. FIG. 12 shows in detail the characteristic of the fuel flow rate and the characteristic of the ratio of fuel flow rate to air flow rate (fuel-air ratio) at combustion switching. The upper diagram shows behavior of the fuel flow rate in the fuel system originally in use during the combustion switching and the lower diagram shows behavior of the fuel-air ratio during the combustion switching. As shown in FIG. 12, the fuel flow rate and the fuel-air ratio drop precipitously immediately after the combustion switching (at time Tsw in the figure). Such a phenomenon may cause a misfire.

Meanwhile, incorporating the water atomization cooling apparatus can improve the output and efficiency of the gas turbine power plant as described earlier. To avoid the risk of misfire in the combustor due to the starting of the water atomization cooling apparatus, the water atomization cooling apparatus is started after the shift into the rated operation mode. This results in an extended period of time required for starting the entire gas turbine power plant.

The present invention has been made in view of the foregoing situation and it is an object of the present invention to provide a controller for a gas turbine power plant, capable of maintaining a steady fuel-air ratio during combustion switching and shortening time required for starting an entire gas turbine power plant.

Means for Solving the Problem

To achieve the foregoing object, a first aspect in accordance with the present invention provides a controller for a gas turbine power plant, the gas turbine power plant including: a compressor that compresses combustion air; a water atomization cooling apparatus that sprays water drops of atomized water supplied via a water atomization flow rate regulating valve over a flow of air drawn in the compressor; a combustor that mixes the compressed combustion air with fuel to thereby burn a fuel-air mixture and generate combustion gas at high temperature and performs combustion switching during operation; a turbine that uses the combustion gas to drive the compressor and a generator; the water atomization flow rate regulating valve that controls a flow rate of the atomized water; and a compressor inlet inner blade that controls a flow rate of air drawn in the compressor. The controller includes: fuel flow rate control means that calculates a fuel flow rate command value to be applied to the combustor; and control means that calculates a fuel-air ratio correction command signal for compensating for reduction in a fuel-air ratio in the combustor occurring during the combustion switching and, based on the fuel-air ratio correction command signal, controls an opening amount of the compressor inlet inner blade or/and an opening amount of the water atomization flow rate regulating valve.

A second aspect in accordance with the present invention provides a controller for a gas turbine power plant, the gas turbine power plant including: a compressor that compresses combustion air; a water atomization cooling apparatus that sprays water drops of atomized water supplied via a water atomization flow rate regulating valve over a flow of air drawn in the compressor; a combustor that mixes the compressed combustion air with fuel to thereby burn a fuel-air mixture and generate combustion gas at high temperature and performs combustion switching during operation; a turbine that uses the combustion gas to drive the compressor and a generator; a fuel flow meter that measures a flow rate of fuel supplied to the combustor; an air flow meter that measures a flow rate of air drawn in the compressor; a water atomization flow meter that measures a flow rate of the atomized water supplied to the water atomization cooling apparatus; an atmospheric condition detector that measures, for example, atmospheric temperature, humidity, or pressure; and the water atomization flow rate regulating valve that controls the flow rate of the atomized water. The controller includes: fuel flow rate control means that calculates a fuel flow rate command value to be applied to the combustor; air flow rate control means that calculates an air flow rate command value to be applied to the compressor; and water atomization flow rate control means that reads values measured by the air flow meter, the fuel flow meter, the water atomization flow meter, and the atmospheric condition detector, the fuel flow rate command value, and the air flow rate command value; calculates a water atomization flow rate correction command value that compensates for reduction in a fuel-air ratio in the combustor occurring at the combustion switching and time of day at which to start control by the water atomization flow rate correction command value; starts the water atomization cooling apparatus before the combustion switching occurs; and controls an opening amount of the water atomization flow rate regulating valve based on a water atomization flow rate command value that incorporates the water atomization flow rate correction command value starting with the control start time of day.

A third aspect in accordance with the present invention provides a controller for a gas turbine power plant, the gas turbine power plant including: a compressor that compresses combustion air; a water atomization cooling apparatus that sprays water drops of atomized water over a flow of air drawn in the compressor; a combustor that mixes the compressed combustion air with fuel to thereby burn a fuel-air mixture and generate combustion gas at high temperature and performs combustion switching during operation; a turbine that uses the combustion gas to drive the compressor and a generator; a fuel flow meter that measures a flow rate of fuel supplied to the combustor; an air flow meter that measures a flow rate of air drawn in the compressor; a water atomization flow meter that measures a flow rate of the atomized water supplied to the water atomization cooling apparatus; an atmospheric condition detector that measures, for example, atmospheric temperature, humidity, or pressure; and a compressor inlet inner blade that controls the flow rate of air drawn in the compressor. The controller includes: fuel flow rate control means that calculates a fuel flow rate command value to be applied to the combustor; water atomization flow rate control means that calculates a water atomization flow rate command value to be applied to the water atomization cooling apparatus; and air flow rate control means that reads values measured by the air flow meter, the fuel flow meter, the water atomization flow meter, and the atmospheric condition detector, the fuel flow rate command value, and the water atomization flow rate command value; calculates an air flow rate correction command value that compensates for reduction in a fuel-air ratio in the combustor occurring at the combustion switching and time of day at which to start control by the air flow rate correction command value; starts the water atomization cooling apparatus before the combustion switching occurs; and controls an opening amount of the compressor inlet inner blade based on an air flow rate command value that incorporates the air flow rate correction command value starting with the control start time of day.

A fourth aspect in accordance with the present invention provides a controller for a gas turbine power plant, the gas turbine power plant including: a compressor that compresses combustion air; a water atomization cooling apparatus that sprays water drops of atomized water supplied via a water atomization flow rate regulating valve over a flow of air drawn in the compressor; a combustor that mixes the compressed combustion air with fuel to thereby burn a fuel-air mixture and generate combustion gas at high temperature and performs combustion switching during operation; a turbine that uses the combustion gas to drive the compressor and a generator; a fuel flow meter that measures a flow rate of fuel supplied to the combustor; an air flow meter that measures a flow rate of air drawn in the compressor; a water atomization flow meter that measures a flow rate of the atomized water supplied to the water atomization cooling apparatus; an atmospheric condition detector that measures, for example, atmospheric temperature, humidity, or pressure; the water atomization flow rate regulating valve that controls the flow rate of the atomized water; and a compressor inlet inner blade that controls the flow rate of air drawn in the compressor. The controller includes: fuel flow rate control means that calculates a fuel flow rate command value to be applied to the combustor; air flow rate control means that calculates an air flow rate command value to be applied to the compressor; and water atomization flow rate control means that reads values measured by the air flow meter, the fuel flow meter, the water atomization flow meter, and the atmospheric condition detector, the fuel flow rate command value, and the air flow rate command value; calculates a water atomization flow rate correction command value that compensates for reduction in a fuel-air ratio in the combustor occurring at the combustion switching and time of day at which to start control by the water atomization flow rate correction command value; starts the water atomization cooling apparatus before the combustion switching occurs; and controls an opening amount of the water atomization flow rate regulating valve based on a water atomization flow rate command value that incorporates the water atomization flow rate correction command value starting with the control start time of day. The air flow rate control means reads values measured by the air flow meter, the fuel flow meter, the water atomization flow meter, and the atmospheric condition detector, the fuel flow rate command value, and the water atomization flow rate command value; calculates an air flow rate correction command value that compensates for reduction in the fuel-air ratio in the combustor occurring at the combustion switching and time of day at which to start control by the air flow rate correction command value; and controls an opening amount of the compressor inlet inner blade based on the air flow rate command value that incorporates the air flow rate correction command value starting with the control start time of day.

Effects of the Invention

The aspect of the present invention controls the water atomization flow rate or/and the air flow rate so as to compensate in advance for fluctuations in the fuel-air ratio occurring as a result of the combustion switching. Unsteady combustion at the time of combustion switching can thus be controlled and a misfire can be prevented. This promotes steady starting of the gas turbine power plant. In addition, the water atomization cooling apparatus can be started quickly after the gas turbine has reached its rated speed. This can shorten time to start the entire gas turbine power plant.

MODES FOR CARRYING OUT THE INVENTION

First Embodiment

Figure 1:
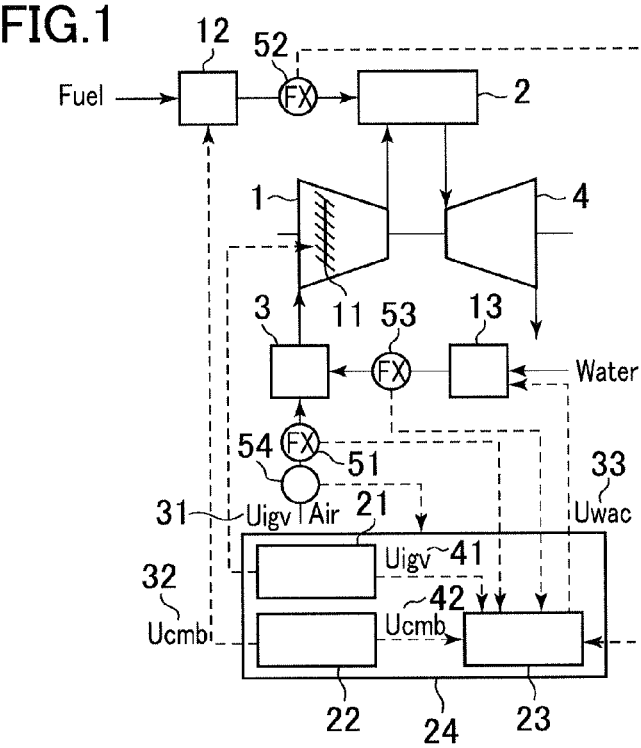
FIG. 1 is a system configuration diagram showing a gas turbine power plant including a controller for a gas turbine power plant according to a first embodiment of the present invention.
Figure 2:
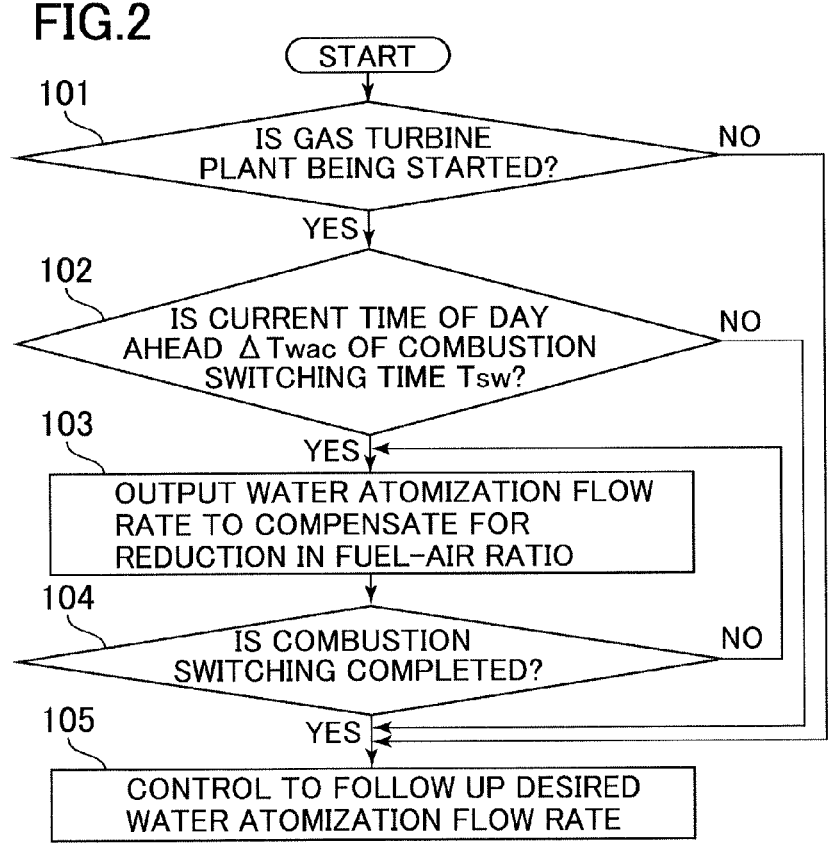
FIG. 2 is a flowchart showing processing steps performed by the controller for a gas turbine power plant according to the first embodiment of the present invention.
Figure 3:
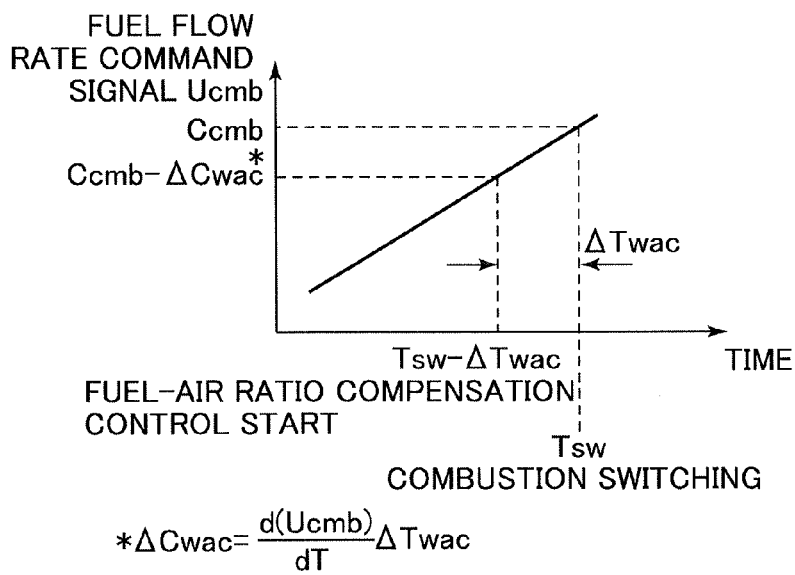
FIG. 3 is a characteristic diagram showing a characteristic of a water atomization flow rate command signal in the controller for a gas turbine power plant according to the first embodiment of the present invention.
Figure 4:
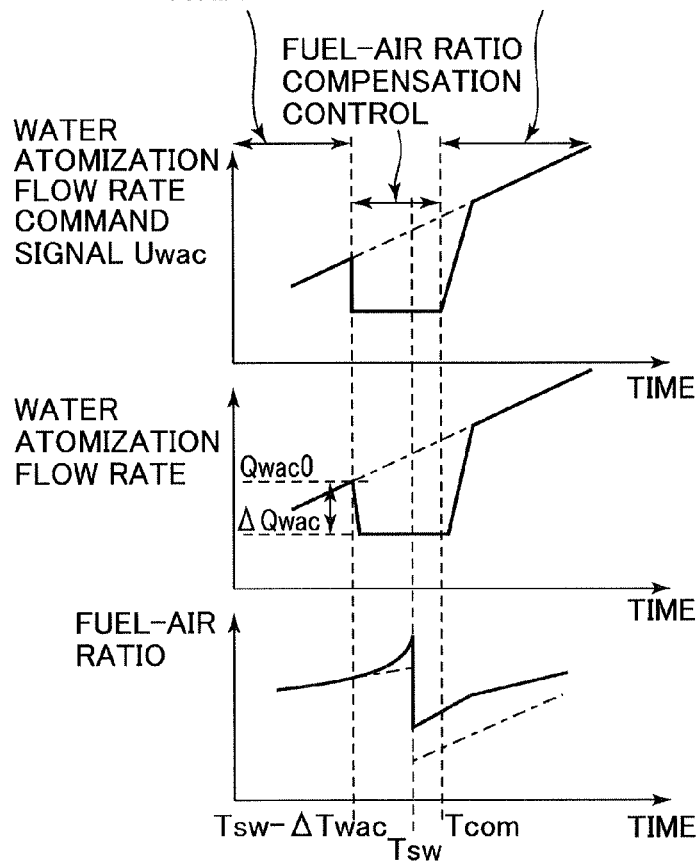
FIG. 4 is a characteristic diagram depicting a fuel flow rate command signal characteristic (upper diagram), a water atomization flow rate characteristic (middle diagram), and a fuel-air ratio characteristic (lower diagram) in the controller for a gas turbine power plant according to the first embodiment of the present invention.

A controller for a gas turbine power plant according to a first embodiment of the present invention will be described below with reference to the accompanying drawings. FIG. 1 is a system configuration diagram showing a gas turbine power plant including the controller for a gas turbine power plant according to the first embodiment of the present invention. FIG. 2 is a flowchart showing processing steps performed by the controller for a gas turbine power plant according to the first embodiment of the present invention. FIG. 3 is a characteristic diagram showing a characteristic of a water atomization flow rate command signal in the controller for a gas turbine power plant according to the first embodiment of the present invention. FIG. 4 is a characteristic diagram depicting a fuel flow rate command signal characteristic (upper diagram), a water atomization flow rate characteristic (middle diagram), and a fuel-air ratio characteristic (lower diagram) in the controller for a gas turbine power plant according to the first embodiment of the present invention.

In FIG. 1, the gas turbine power plant generally includes a compressor 1, a combustor 2, a turbine 4, and a water atomization cooling apparatus 3. The compressor 1 compresses combustion air. The combustor 2 mixes the compressed combustion air with fuel to thereby burn a fuel-air mixture and generate combustion gas at high temperature. The turbine 4 uses the combustion gas to drive the compressor 1 and a generator not shown. The water atomization cooling apparatus 3 sprays water drops over a flow of air drawn in the compressor 1.

A flow rate of air drawn in the compressor 1, or a drawn air flow rate, is regulated by a compressor inlet inner blade 11. A fuel flow rate supplied to the combustor 2 is regulated by a fuel flow rate regulating valve 12. A water atomization flow rate sprayed over the air flow by the water atomization cooling apparatus 3 is regulated by a water atomization flow rate regulating valve 13. These regulating devices 11 to 13 are controlled by respective command signals from a controller 24.

The present embodiment includes the controller 24 that causes the water atomization cooling apparatus 3 to start spraying water drops prior to the combustion switching in order to shorten time required for starting the gas turbine power plant and compensate for the fuel-air ratio and that controls the water atomization flow rate regulating valve 13 so as to reduce the water atomization flow rate before the combustion switching.

The controller 24 includes an air flow rate control circuit 21, a fuel flow rate control circuit 22, and a water atomization flow rate control circuit 23. Specifically, the air flow rate control circuit 21 calculates the drawn air flow rate and outputs a result as air flow rate command signals Uigv 31 and 41. The fuel flow rate control circuit 22 calculates the fuel flow rate and outputs a result as fuel flow rate command signals Ucmb 32 and 42. The water atomization flow rate control circuit 23 calculates the water atomization flow rate and outputs a result as a water atomization flow rate command signal Uwac 33.

As shown in FIG. 1, the water atomization flow rate control circuit 23 receives as inputs thereto at least one of a detection signal of an air flow meter 51 that measures the air flow rate drawn in the compressor 1, a detection signal of a fuel flow meter 52 that measures the fuel flow rate supplied to the combustor 2, a detection signal of a water atomization flow meter 53 that measures the water atomization flow rate sprayed from the water atomization cooling apparatus 3, a detection signal of an atmospheric condition detector 54 that measures, for example, atmospheric temperature, humidity, or pressure (any one of the foregoing, or a combination thereof), the air flow rate command signal Uigv 41 output from the air flow rate control circuit 21, and the fuel flow rate command signal Ucmb 42 output from the fuel flow rate control circuit 22. The water atomization flow rate control circuit 23 may receive any other signal that can be used for calculating the water atomization flow rate. In addition, the water atomization flow rate control circuit 23 generates as its output the water atomization flow rate command signal Uwac 33 to be applied to the water atomization flow rate regulating valve 13. It is noted that the air flow meter 51 may be a type that can determine the air flow rate, specifically, that, for example, calculates the air flow rate based on pressure, instead of the type that directly measured the air flow rate.

The air flow rate control circuit 21 and the fuel flow rate control circuit 22 receive as inputs thereto at least one of the detection signal of the air flow meter 51, the detection signal of the fuel flow meter 52, the detection signal of the water atomization flow meter 53, the detection signal of the atmospheric condition detector 54, the air flow rate command signal Uigv 31, the fuel flow rate command signal Ucmb 32, the water atomization flow rate command signal Uwac 33, the speed of the compressor 1, and the load on the gas turbine 4. Then, based on a change in state quantity during starting of the gas turbine power plant, the air flow rate control circuit 21 calculates the air flow rate and the fuel flow rate control circuit 22 calculates the fuel flow rate. Thereby, the air flow rate control circuit 21 generates as its output the air flow rate command signals Uigv 31 and 41 and the fuel flow rate control circuit 22 generates as its output the fuel flow rate command signals Ucmb 32 and 42.

The air flow rate command signal Uigv 31 is output from the air flow rate control circuit 21 to the compressor inlet inner blade 11 to thereby vary an opening amount of the compressor inlet inner blade 11. This adjusts the air flow rate. The fuel flow rate command signal Ucmb 32 is output from the fuel flow rate control circuit 22 to the fuel flow rate regulating valve 12 to thereby vary an opening amount of the fuel flow rate regulating valve 12. This adjusts the fuel flow rate. The water atomization flow rate command signal Uwac 33 is output from the water atomization flow rate control circuit 23 to the water atomization flow rate regulating valve 13 to thereby vary an opening amount of the water atomization flow rate regulating valve 13. This adjusts the water atomization flow rate.

Figure 9:
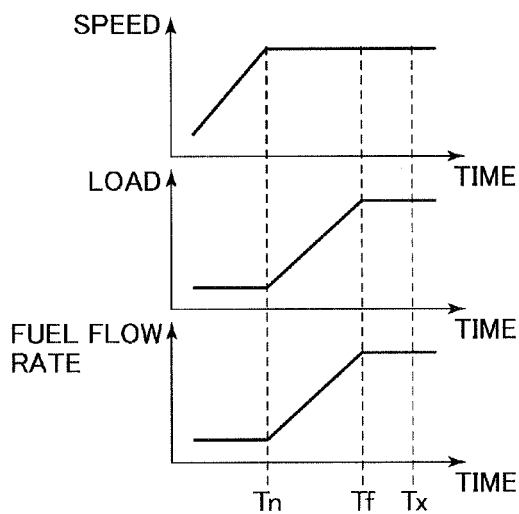
FIG. 9 is a characteristic diagram depicting a speed characteristic (upper diagram), a generator load characteristic (middle diagram), and a fuel flow rate characteristic (lower diagram) of a related-art gas turbine power plant.
Figure 10:
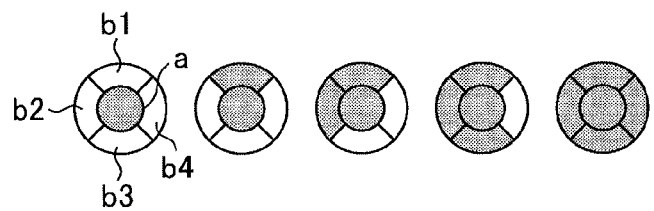
FIG. 10 is a cross-sectional view showing an arrangement of burners that constitute a combustor of the related-art gas turbine power plant.
Figure 11:
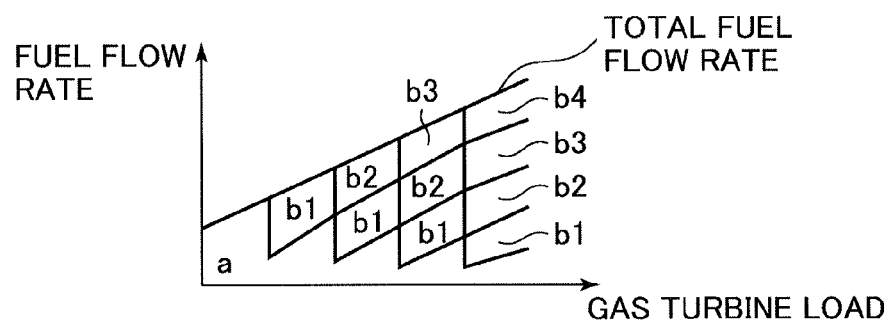
FIG. 11 is a characteristic diagram showing the fuel flow rate of each burner relative to gas turbine load in the related-art gas turbine power plant.
Figure 12:
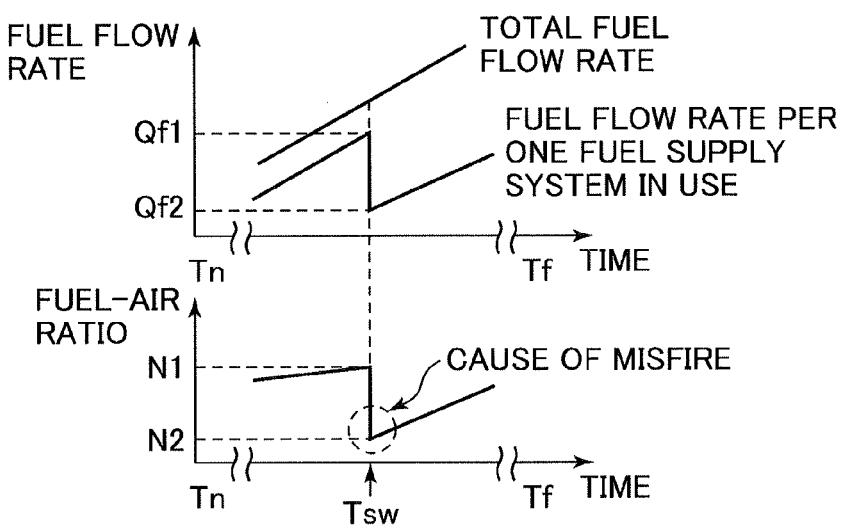
FIG. 12 is a characteristic diagram depicting a fuel flow rate characteristic (upper diagram) at combustion switching and a fuel-air ratio characteristic (lower diagram) at combustion switching in the related-art gas turbine power plant.

Characteristic operation of the water atomization flow rate control circuit 23 during starting of the gas turbine power plant will be described below with reference to FIGS. 9 and 12.

(1) Start commands for the water atomization cooling apparatus 3 and the water atomization flow rate regulating valve 13 and a water drop spray start command from the water atomization cooling apparatus 3 are output at a point in time before the combustion switching (time Tsw of FIG. 12) while the load is being increased prior to the shift (time Tf of FIG. 9) to the rated operation. The water drop spray start command is output after the combustor 2 has been ignited, a gas turbine starter is disconnected, or the speed of the compressor 1 has exceeded a dangerous speed zone, or, if specific timings for these operations are known, during the corresponding operation.

(2) Once the water drop spray has been started, the water atomization flow rate is determined based on the atmospheric condition and the state quantity during starting of the gas turbine power plant and the water atomization flow rate command signal Uwac 33 is output to the water atomization flow rate regulating valve 13.

(3) During a period of time that begins with predetermined time ahead of the combustion switching time and ends with the completion of the combustion switching, a water atomization flow rate as an advance compensation for reduction in the fuel-air ratio involved with the combustion switching (hereinafter referred to as a compensation water atomization flow rate) is determined and the water atomization flow rate command signal Uwac 33 is output. The "predetermined time" as used herein refers to a period of time at which a change in the water atomization flow rate starts affecting the fuel-air ratio.

Internal operation of the water atomization flow rate control circuit 23 will be described in detail below with reference to FIGS. 2 to 4.

In FIG. 2, it is first determined in step S101 whether the gas turbine power plant is being started. A possible method for making this determination is to monitor, for example, the detection signal of the air flow meter 51 or the air flow rate command signal Uigv 31, or the detection signal of the fuel flow meter 52 or the fuel flow rate command signal Ucmb 32; if these signals indicate an increase with time, the gas turbine power plant can be determined to be being started. Another possible method may comply with a well-known method for determining the starting of the gas turbine power plant. If it is determined that the gas turbine power plant is being started, the step is answered Yes and step S102 is to be performed. If it is determined that the gas turbine power plant is not being started, the step is answered No and step S105 is to be performed.

In step S102, a time difference between the current time of day and the time Tsw at which the combustion switching is expected to be performed is calculated and it is determined whether the time difference is greater than $\partial$Twac at which a change in the water atomization flow rate starts affecting the fuel-air ratio. Specifically, it is determined whether the current time of day is ahead of Tsw−$\partial$Twac.

The value of $\partial$Twac at which a change in the water atomization flow rate starts affecting the fuel-air ratio is established in advance through, for example, experiments and calculation. Specifically, the value represents, for example, a time lag between time at which water drops are sprayed from the water atomization cooling apparatus 3 and time at which the sprayed water drops reach the combustor inlet. The amount of water drops reaching the combustor inlet is the air flow rate supplied to the combustor 2 from which the drawn air flow rate of the compressor 1 is subtracted. The amount of water drops sprayed from the water atomization cooling apparatus 3 is the water atomization flow rate measured by the water atomization flow meter 53. The air flow rate supplied to the combustor 2 is a value measured by a flow meter (not shown) disposed at the air inlet to the combustor 2. The drawn air flow rate of the compressor 1 is a value measured by the air flow meter 51. These values are values actually measured in the gas turbine power plant. If measurement is not feasible, however, the values may be calculated with a calculation model that simulates the gas turbine power plant. In addition, such a time lag can be accurately established, in particular, from measured values or theoretical values obtained for the water atomization flow rate when a step signal is applied to the water atomization flow rate regulating valve 13, the air flow rate supplied to the combustor 2, and the drawn air flow rate of the compressor 1.

The time Tsw−∂Twac is a value determined based on the fuel flow rate command signal Ucmb 32, or the detection signal of the fuel flow meter 52, or the air flow rate command signal Uigv 31, or the detection signal of the air flow meter 51, and the load on the generator.

The calculation method herein involved will be described below with reference to FIG. 3. FIG. 3 shows time-series characteristics of the fuel flow rate command signal Ucmb 32. For example, the combustion switching is started at time Tsw at which the fuel flow rate command signal Ucmb increases to reach Ccmb.

(1) It is here noted that the time Tsw−∂Twac is time at which the condition Ucmb=Ccmb−∂Twac×dUcmb/dT is satisfied, where Ccmb is a value established according to a predetermined sequence or rule and dUcmb/dT is an amount of change per unit time of the fuel flow rate command signal Ucmb 32.

(2) If Ucmb=Ccmb−∂Twac×dUcmb/dT, the current time of day is determined to be the time Tsw−∂Twac.

Reference is now made back to FIG. 2. If it is determined in step S102 that the current time of day is ∂Twac or more ahead of the expected combustion switching time Tsw, the step is answered Yes and step S103 is to be performed. If it is determined that the current time of day is not ∂Twac or more ahead of the expected combustion switching time Tsw, the step is answered No and step S105 is to be performed.

In step S103, the water atomization flow rate to compensate for reduction in the fuel-air ratio that is expected to occur at the expected combustion switching time Tsw is calculated and output as the water atomization flow rate command signal Uwac 33. A possible method for determining the water atomization flow rate to compensate for the reduction in the fuel-air ratio is, as shown in the middle water atomization flow rate characteristic diagram of FIG. 4, to set as the compensation water atomization flow rate a water atomization flow rate Qwac0 at the time Tsw−∂Qwac from which a reduction amount ∂Qwac is subtracted.

The reduction amount ∂Qwac is established in advance based on, for example, experiments and calculation. Specifically, for example, as shown in FIG. 12, when the fuel flow rate per one fuel supply system in use is reduced from Qf1 to Qf2 at the combustion switching time Tsw and the fuel-air ratio is reduced from N1 to N2, the reduction amount ∂Qwac can be calculated with ∂Qwac=(Qf1−Qf2)/Qf1×Qa using the fuel flow rate, or with ∂Qwac=(N1−N2)/N1×Qa using the fuel-air ratio. Where, Qa is the air flow rate supplied to the combustor at the combustion switching time Tsw or the air flow rate supplied to the combustor at the time Tsw−∂Twac. The fuel-air ratio immediately before the combustion switching is N1=Qf1/Qa and the fuel-air ratio immediately after the combustion switching in the related art is N2=Qf2/Qa. To maintain the fuel-air ratio immediately after the combustion switching at the value N1 equivalent to that immediately before the combustion switching by compensating the air flow rate as Qa−∂Qwac, Qf1/Qa=Qf2/(Qa−∂Qwac) needs to be satisfied. From the foregoing expression, ∂Qwac=(Qf1−Qf2)/Qf1×Qa can be derived. Substituting N2 for Qf2/Qa and N1 for Qf1/Qa to give an expression that incorporates the fuel-air ratio derives ∂Qwac=(N1−N2)/N1×Qa.

The compensation water atomization flow rate may still be established using a water atomization flow rate that is the water atomization flow rate Qwac0 reduced at a predetermined rate. The value may be one established according to a predetermined procedure as long as such a value compensates for reduction in the fuel-air ratio at the combustion switching.

In step S104, it is determined whether the combustion switching is completed. The combustion switching may, for example, be determined to be completed when a predetermined period of time has elapsed since the start of the combustion switching or when exhaust temperature or an exhaust flow rate reaches a predetermined value. Alternatively, any other well-known method for detecting the completion of the combustion switching may be used. If it is determined that the combustion switching is completed, the step is answered Yes and step S105 is to be performed. If it is determined that the combustion switching is not completed, the step is answered No and step S103 is to be performed again.

In step S105, control is performed to cause the water atomization flow rate to follow up a desired water atomization flow rate. The "desired water atomization flow rate" as used herein refers to a water atomization flow rate required for operation at a particular point in time, such as, for example, the water atomization flow rate required for the combustion air to achieve predetermined humidity and the water atomization flow rate required for achieving a predetermined ratio of water atomization flow rate to air flow rate. The water atomization flow rate required for the combustion air to achieve the predetermined humidity is, specifically, for example, a difference between an amount of water vapor required for achieving the predetermined humidity and an amount of water vapor contained in the atmosphere. These values are calculated based on the air flow rate and humidity. Specifically, the air flow rate is calculated based on the detection signal of the air flow meter 51 or the air flow rate command signal Uigv 31, and the humidity is calculated based on the detection signal of the atmospheric condition detector 54 that measures, for example, atmospheric temperature, humidity, or pressure.

The water atomization flow rate required for achieving a predetermined ratio of water atomization flow rate to air flow rate is, specifically, for example, a predetermined ratio of water atomization flow rate to air flow rate multiplied by the air flow rate. The air flow rate is calculated based on the detection signal of the air flow meter 51 or the air flow rate command signal Uigv 31.

P control, PI control, or PID control is then performed so that the water atomization flow rate follows up the desired water atomization flow rate based on the water atomization flow rate measured by the water atomization flow meter 53. Any well-known method to perform the follow-up control may be used, as long as such a method outputs the water atomization flow rate command signal Uwac 33 that causes a smaller amount of water drops to be sprayed when the water atomization flow rate is more than the desired water atomization flow rate and that causes a greater amount of water drops to be sprayed when the water atomization flow rate is less than the desired water atomization flow rate.

With reference to FIG. 4, changes will be described in the water atomization flow rate command signal Uwac 33, the water atomization flow rate from the water atomization cooling apparatus 3, and the fuel-air ratio of the combustor 2 when the water atomization flow rate control circuit 23 is operated according to the flowchart of FIG. 2 described above.

As shown in the upper diagram of FIG. 4, the water atomization flow rate regulating valve 13 is controlled to follow up the desired water atomization flow rate for the period of time from the start to the time Tsw−∂Twac; thereafter, the water atomization flow rate regulating valve 13 is controlled for fuel-air ratio compensation for reduced water atomization flow rates until a combustion switching completion time Tcom. The water atomization flow rate regulating valve 13 is then controlled again to follow up the desired water atomization flow rate after the combustion switching completion time Tcom.

During this time, the water atomization flow rate decreases from Qwac0 to Qwac0−∂Qwac after the time Tsw−∂Twac as shown in the middle diagram of FIG. 4. This causes the combustion air flow rate to decrease, so that the fuel-air ratio increases as shown by the solid line in the lower diagram of FIG. 4. This increase in the fuel-air ratio is attributable to the air flow rate being decreased relative to the related-art air flow rate. At the time Tsw thereafter, the combustion switching causes the fuel-air ratio to decrease. The performance of the control to increase the fuel-air ratio in advance of the time of combustion switching as described above allows a related-art mode in which reduction in the fuel-air ratio occurs at the combustion switching (indicated by the dash-single-dot line in the lower diagram of FIG. 4) to be changed to a mode indicated by the solid line in the lower diagram of FIG. 4, thus controlling the reduction in the fuel-air ratio.

As a result, the misfire can be prevented and the starting of the gas turbine power plant can be stabilized. Moreover, starting of the water atomization cooling apparatus prior to the shift of the gas turbine into the rated operation mode enables overall plant starting time to be shortened.

In the controller for a gas turbine power plant according to the first embodiment of the present invention described above, the water atomization flow rate is controlled so as to compensate for fluctuations in the fuel-air ratio in advance. Thus, unsteady combustion at the time of combustion switching can be controlled and a misfire can be prevented. This promotes steady starting of the gas turbine power plant. In addition, the water atomization cooling apparatus can be started quickly after the gas turbine has reached its rated speed. This can shorten time to start the entire gas turbine power plant.

Second Embodiment

Figure 5:
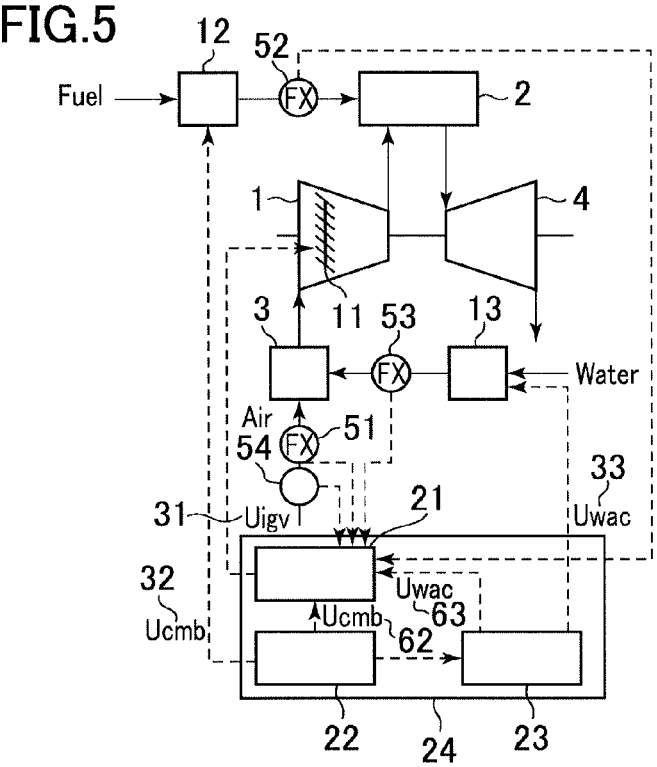
FIG. 5 is a system configuration diagram showing a gas turbine power plant including a controller for a gas turbine power plant according to a second embodiment of the present invention.
Figure 6:
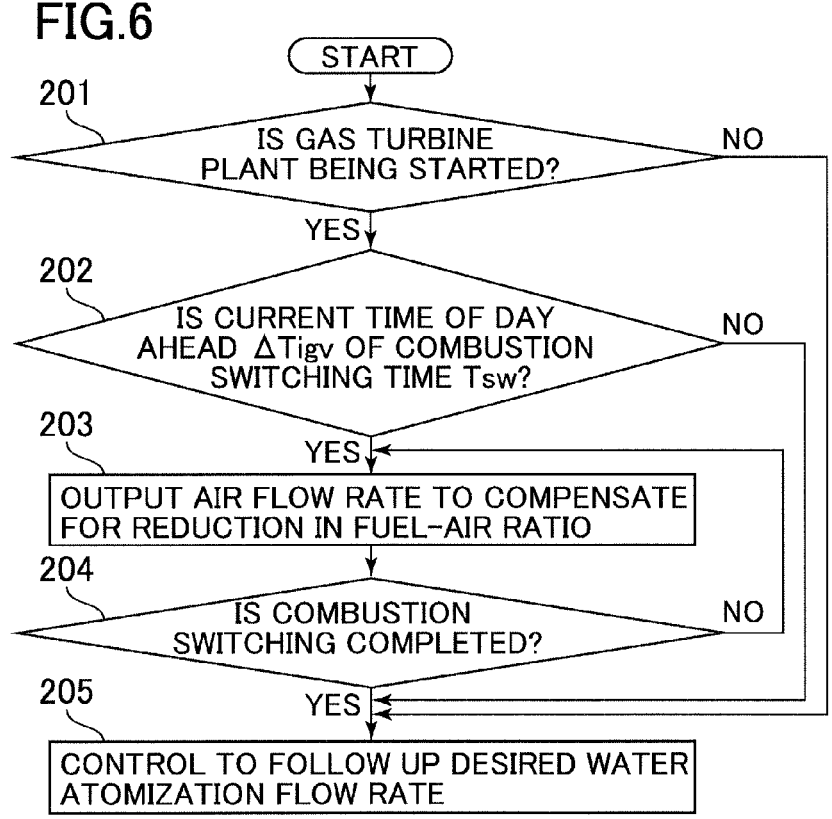
FIG. 6 is a flowchart showing processing steps performed by the controller for a gas turbine power plant according to the second embodiment of the present invention.
Figure 7:
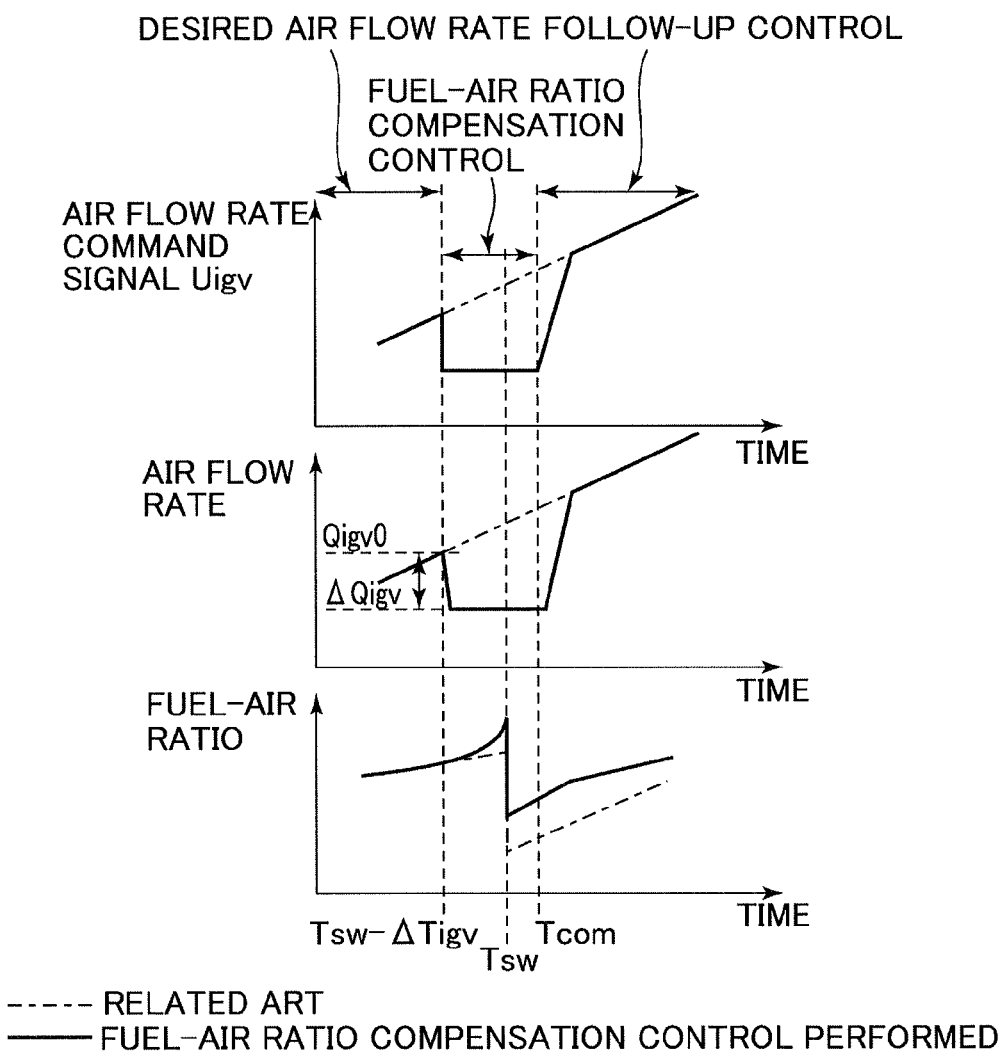
FIG. 7 is a characteristic diagram depicting an air flow rate command signal characteristic (upper diagram), an air flow rate characteristic (middle diagram), and a fuel-air ratio characteristic (lower diagram) in the controller for a gas turbine power plant according to the second embodiment of the present invention.

A controller for a gas turbine power plant according to a second embodiment of the present invention will be described below with reference to the accompanying drawings. FIG. 5 is a system configuration diagram showing a gas turbine power plant including the controller for a gas turbine power plant according to the second embodiment of the present invention. FIG. 6 is a flowchart showing processing steps performed by the controller for a gas turbine power plant according to the second embodiment of the present invention. FIG. 7 is a characteristic diagram depicting an air flow rate command signal characteristic (upper diagram), an air flow rate characteristic (middle diagram), and a fuel-air ratio characteristic (lower diagram) in the controller for a gas turbine power plant according to the second embodiment of the present invention. In FIGS. 5 to 7, like or corresponding parts are identified by the same reference numerals as those used in FIGS. 1 to 4 and detailed descriptions for those parts will be omitted.

The gas turbine power plant according to the first embodiment of the present invention includes the controller 24 that causes the water atomization cooling apparatus 3 to start spraying water drops prior to the combustion switching in order to shorten time required for starting the gas turbine power plant and compensate for the fuel-air ratio and that controls the water atomization flow rate regulating valve 13 so as to reduce the water atomization flow rate before the combustion switching. In contrast, the gas turbine power plant according to the second embodiment of the present invention includes a controller 24 that causes a water atomization cooling apparatus 3 to start spraying water drops prior to the combustion switching and that controls an opening amount of a compressor inlet inner blade 11 so as to reduce the air flow rate before the combustion switching. Other elements that constitute the gas turbine power plant according to the second embodiment of the present invention are the same as those in the first embodiment.

More specifically, as compared with the arrangements of the first embodiment, a water atomization flow rate control circuit 23 and an air flow rate control circuit 21 included in the controller 24 operate differently. To perform compensation control for the fuel-air ratio, the first embodiment uses the water atomization flow rate, whereas the second embodiment uses the air flow rate. Thus, various types of signals to be used for fuel-air ratio compensation are applied to the air flow rate control circuit 21 in FIG. 5, as against the water atomization flow rate control circuit 23 in FIG. 1.

In this embodiment, the water atomization flow rate control circuit 23 outputs a water atomization flow rate command signal Uwac 63 that causes the water atomization flow rate to follow up the desired water atomization flow rate.

As shown in FIG. 5, the air flow rate control circuit 21 receives as inputs thereto at least one of a detection signal of an air flow meter 51 that measures the air flow rate drawn in a compressor 1, a detection signal of a fuel flow meter 52 that measures the fuel flow rate supplied to a combustor 2, a detection signal of a water atomization flow meter 53 that measures the water atomization flow rate sprayed from the water atomization cooling apparatus 3, a detection signal of an atmospheric condition detector 54 that measures, for example, atmospheric temperature, humidity, or pressure, a fuel flow rate command signal Ucmb 62 output from a fuel flow rate control circuit 22, and a water atomization flow rate command signal Uwac 63 output from the water atomization flow rate control circuit 23. The air flow rate control circuit 21 may receive any other signal that can be used for calculating the air flow rate. In addition, the air flow rate control circuit 21 generates as its output an air flow rate command signal Uigv 31 to be applied to the compressor inlet inner blade 11.

During starting of the gas turbine power plant, the air flow rate control circuit 21 determines the opening amount of the compressor inlet inner blade 11 so as to allow an air flow rate that satisfies a predetermined condition to be drawn in the compressor 1 and outputs the air flow rate command signal Uigv 31. In addition, for a period of time that begins with predetermined time ahead of the combustion switching time and ends with the completion of the combustion switching, the air flow rate control circuit 21 determines an air flow rate as an advance compensation for reduction in the fuel-air ratio involved with the combustion switching and outputs the air flow rate command signal Uigv 31. The "predetermined time" as used herein refers to a period of time at which a change in the air flow rate starts affecting the fuel-air ratio.

Internal operation of the air flow rate control circuit 21 will be described in detail below with reference to FIGS. 5 to 7. The air flow rate control circuit 21 has an internal operating logic identical to that of the water atomization flow rate control circuit 23 in the first embodiment in performing its processing steps, although the air flow rate control circuit 21 controls the drawn air flow rate, instead of the water atomization flow rate controlled by the water atomization flow rate control circuit 23 in the first embodiment.

In FIG. 6, it is first determined in step S201 whether the gas turbine power plant is being started. This determination is made in a similar manner as in the first embodiment. If it is determined that the gas turbine power plant is being started, the step is answered Yes and step S202 is to be performed. If it is determined that the gas turbine power plant is not being started, the step is answered No and step S205 is to be performed.

In step S202, a time difference between the current time of day and time Tsw at which the combustion switching is expected to be performed is calculated and it is determined whether the time difference is greater than time $\partial$Tigv at which a change in the opening amount of the compressor inlet inner blade 11 starts affecting the fuel-air ratio. Specifically, it is determined whether the current time of day is ahead of Tsw−$\partial$Tigv. If it is determined that the current time of day is $\partial$Tigv or more ahead of the expected combustion switching time Tsw, the step is answered Yes and step S203 is to be performed. If it is determined that the current time of day is not $\partial$Tigv or more ahead of the expected combustion switching time Tsw, the step is answered No and step S205 is to be performed.

In step S203, the air flow rate to compensate for reduction in the fuel-air ratio that is expected to occur at the expected combustion switching time Tsw is calculated and output as the air flow rate command signal Uigv 31. A possible method for determining the air flow rate to compensate for the reduction in the fuel-air ratio is, as shown in the middle air flow rate characteristic diagram of FIG. 7, to calculate an air flow rate that is an air flow rate Qigv1 at the time Tsw−$\partial$Tigv from which a compensation air flow rate $\partial$Qigv predetermined through, for example, experiments and calculation is subtracted, or an air flow rate that is the air flow rate Qigv1 reduced at a predetermined rate.

In step S204, it is determined whether the combustion switching is completed. The combustion switching is determined to be completed by the same method as in the first embodiment. If it is determined that the combustion switching is completed, the step is answered Yes and step S205 is to be performed. If it is determined that the combustion switching is not completed, the step is answered No and step S203 is to be performed again.

In step S205, control is performed to cause the air flow rate to follow up a desired air flow rate. The "desired air flow rate" as used herein refers to, for example, an air flow rate required for achieving a predetermined fuel-air ratio or satisfying a relation with predetermined gas turbine load. Any well-known method for establishing an air flow rate during starting may be used to determine the desired air flow rate.

With reference to FIG. 7, changes will be described in the air flow rate command signal Uigv 31, the flow rate of air drawn in the compressor 1, and the fuel-air ratio of the combustor 2 when the air flow rate control circuit 21 is operated according to the flowchart of FIG. 6 described above.

As shown in the upper diagram of FIG. 7, the compressor inlet inner blade 11 is controlled to follow up the desired air flow rate for the period of time from the gas turbine power plant start to the time Tsw−$\partial$Tigv; thereafter, the compressor inlet inner blade 11 is controlled for fuel-air ratio compensation until a combustion switching completion time Tcom. The compressor inlet inner blade 11 is then controlled again to follow up the desired air flow rate according to step 205 after the combustion switching completion time Tcom.

During this time, the air flow rate is decreased from Qigv0 to Qigv0−$\partial$Qigv after the time Tsw−$\partial$Tigv as shown in the middle diagram of FIG. 7. This causes the combustion air flow rate to decrease, so that the fuel-air ratio increases as shown by the solid line in the lower diagram of FIG. 7. This increase in the fuel-air ratio is attributable to the air flow rate being decreased relative to the related-art air flow rate. At the time Tsw thereafter, the combustion switching causes the fuel-air ratio to decrease. The performance of the control to increase the fuel-air ratio in advance of the time of combustion switching as described above allows a related-art mode in which reduction in the fuel-air ratio occurs at the combustion switching (indicated by the dash-single-dot line in the lower diagram of FIG. 7) to be changed to a mode indicated by the solid line in the lower diagram of FIG. 7, thus controlling the reduction in the fuel-air ratio.

Making the air flow rate control circuit 21 operate according to the flowchart shown in FIG. 6 as described above achieves effects similar to those achieved by the first embodiment in which the water atomization flow rate control circuit 23 is made to operate according to the flowchart shown in FIG. 2. This embodiment is particularly effective in a case in which control of the water atomization flow rate cannot be used beyond a certain operating range.

In the controller for a gas turbine power plant according to the second embodiment of the present invention described above, the air flow rate is controlled so as to compensate for fluctuations in the fuel-air ratio in advance. Thus, unsteady combustion at the time of combustion switching can be controlled and a misfire can be prevented. This promotes steady starting of the gas turbine power plant. In addition, the water atomization cooling apparatus can be started quickly after the gas turbine has reached its rated speed. This can shorten time to start the entire gas turbine power plant.

In addition, the embodiment can also respond to a case in which the gas turbine power plant to which the present invention is applied has a limited controllable range of the water atomization flow rate and the control cannot be used beyond a certain operating range, so that the embodiment can achieve the above-described effects.

Third Embodiment

Figure 8:
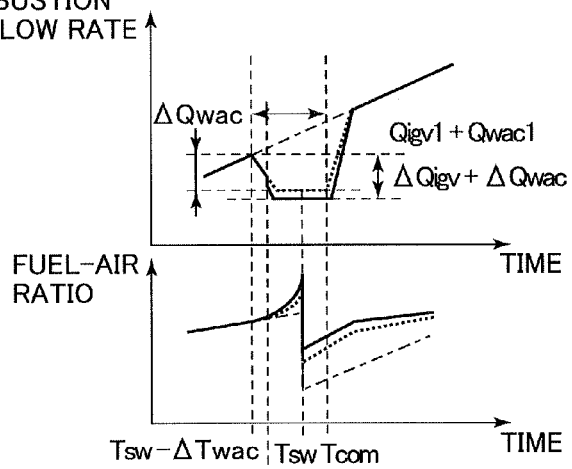
FIG. 8 is a characteristic diagram depicting an air flow rate command signal characteristic (upper diagram) and a fuel-air ratio characteristic (lower diagram) in a controller for a gas turbine power plant according to a third embodiment of the present invention.

A controller for a gas turbine power plant according to a third embodiment of the present invention will be described below with reference to the accompanying drawings. FIG. 8 is a characteristic diagram depicting an air flow rate command signal characteristic (upper diagram) and a fuel-air ratio characteristic (lower diagram) in the controller for a gas turbine power plant according to the third embodiment of the present invention. In FIG. 8, like or corresponding parts are identified by the same reference numerals as those used in FIGS. 1 to 7 and detailed descriptions for those parts will be omitted.

The gas turbine power plant according to the third embodiment of the present invention represents a combination of the first and second embodiments of the present invention. The gas turbine power plant according to the third embodiment of the present invention includes a controller 24 that causes a water atomization cooling apparatus 3 to start spraying water drops prior to the combustion switching in order to shorten time required for starting the gas turbine power plant and compensate for the fuel-air ratio, controls a water atomization flow rate regulating valve 13 so as to reduce the water atomization flow rate before the combustion switching, and controls an opening amount of a compressor inlet inner blade 11 so as to reduce the air flow rate before the combustion switching. Other elements that constitute the gas turbine power plant according to the third embodiment of the present invention are the same as those in the first embodiment.

With reference to FIG. 8, changes will be described in the combustion air flow rate supplied to a combustor 2 and the fuel-air ratio of the combustor 2 according to the present embodiment.

For the period of time from the gas turbine power plant start to the time Tsw−∂Twac, the water atomization flow rate regulating valve 13 is controlled to follow up the desired water atomization flow rate and the compressor inlet inner blade 11 is controlled to follow up the desired water atomization flow rate. Up to the time Tsw−∂Tigv thereafter, the water atomization flow rate regulating valve 13 is controlled for fuel-air ratio compensation, while the compressor inlet inner blade 11 is still controlled to follow up the desired water atomization flow rate. Up to the time Tcom thereafter, the water atomization flow rate regulating valve 13 and the compressor inlet inner blade 11 are controlled for fuel-air ratio compensation. After the time Tcom, again, the water atomization flow rate regulating valve 13 is controlled to follow up the desired water atomization flow rate and the compressor inlet inner blade 11 is controlled to follow up the desired water atomization flow rate.

From the start to the time Tsw−∂Twac during this time, the combustion air flow rate is a sum of the desired water atomization flow rate and the desired air flow rate as shown by the solid line in the upper diagram of FIG. 8. The combustion air flow rate decreases for the subsequent period from the time Tsw−∂Twac to the time Tsw−∂Tigv and marks a considerable decrease immediately after the time Tsw−∂Tigv. This is because, for the period from the time Tsw−∂Twac to the time Tsw−∂Tigv, the combustion air flow rate is reduced only with the water atomization flow rate regulating valve 13; but for the period from time Tsw−∂Tigv to the time Tcom, the combustion air flow rate is reduced with both the water atomization flow rate regulating valve 13 and the compressor inlet inner blade 11. After the time Tcom, the combustion air flow rate follows up the sum of the desired water atomization flow rate and the desired air flow rate.

The changes in the fuel-air ratio are equivalent to those in the related art (indicated by the dash-single-dot line) for the period from the start to the time Tsw−∂Twac as shown by the solid line in the lower diagram of FIG. 8. The fuel-air ratio increases for the period from the time Tsw−∂Twac to the time Tsw−∂Tigv and marks a further increase immediately after the time Tsw−∂Tigv. This is due to the change in the combustion air flow rate described above. The fuel-air ratio is thereafter decreased by the combustion switching at the time Tsw.

As described above, compared with the gas turbine system including the controller 24 that has only the water atomization flow rate adjusting function (indicated by the dotted line in the lower diagram of FIG. 8) and the gas turbine system including the controller 24 that has only the air flow rate adjusting function, the gas turbine system including the controller 24 that has both the water atomization flow rate adjusting function and the air flow rate adjusting function can vary a reduction width of the combustion air flow rate by even a large margin of ∂Qigv+∂Qwac, thus widening a range of fuel-air ratio to be compensated. Response to changes in the combustion air flow rate can also be improved, so that the fuel-air ratio can be increased within a short period of time during the fuel-air ratio compensation control and a period of time during which the fuel-air ratio remains high can be shortened.

It is noted that FIG. 8 shows an example in which ∂Twac is longer than ∂Tigv. As compared with the gas turbine system including the controller 24 that has only the water atomization flow rate adjusting function and the gas turbine system including the controller 24 that has only the air flow rate adjusting function, the gas turbine system including the controller 24 that has both the water atomization flow rate adjusting function and the air flow rate adjusting function can still widen the range of fuel-air ratio to be compensated, improve the response to changes in the combustion air flow rate, increase the fuel-air ratio within a short period of time during the fuel-air ratio compensation control, and shorten the period of time during which the fuel-air ratio remains high, even with the relation between ∂Twac and ∂Tigv reversed.

In the controller for the gas turbine power plant according to the third embodiment of the present invention, the same effects as those of the first and second embodiments of the present invention can be achieved and the range of fuel-air ratio to be compensated can be widened.

DESCRIPTION OF REFERENCE NUMERALS

1 Compressor
2 Combustor
3 Water atomization cooling apparatus
4 Turbine
11 Compressor inlet inner blade
12 Fuel flow rate regulating valve
13 Water atomization flow rate regulating valve
21 Air flow rate control circuit
22 Fuel flow rate control circuit
23 Water atomization flow rate control circuit
24 Controller
31 Air flow rate command signal
32 Fuel flow rate command signal
33 Water atomization flow rate command signal
41 Air flow rate command signal
42 Fuel flow rate command signal
51 Air flow meter
52 Fuel flow meter
53 Water atomization flow meter
54 Atmospheric condition detector
62 Fuel flow rate command signal
63 Water atomization flow rate command signal

The invention claimed is:

1. A control system for a gas turbine power plant, the gas turbine power plant including:
   a compressor (1) that compresses combustion air;
   a water atomization cooling apparatus (3) that sprays water drops of atomized water supplied via a water atomization flow rate regulating valve (13) over a flow of air drawn in the compressor (1);
   a combustor (2) that includes a plurality of burners and fuel supply systems that supply fuel to each of the corresponding burners; mixes the compressed combustion air with fuel to thereby burn a fuel-air mixture and generate combustion gas at high temperature; and performs combustion switching which add the fuel supply systems to be used for distributing the fuel flow rate as the total fuel flow rate increases;
   a turbine (4) that uses the combustion gas to drive the compressor (1) and a generator;
   the water atomization flow rate regulating valve (13) that controls a flow rate of the atomized water; and a compressor inlet inner blade (11) that controls a flow rate of air drawn in the compressor (1), the control system comprising:

a fuel flow rate control circuit (22) that calculates a fuel flow rate command value (32) to be applied to the combustor (2); and a controller (24) that calculates a fuel-air ratio correction command signal to compensate in advance for reduction in a fuel-air ratio occurring at the combustor (2) during the combustion switching and, based on the fuel-air ratio correction command signal, controls at least one of an opening amount of the compressor inlet inner blade (11) and an opening amount of the water atomization flow rate regulating valve (13) based on the fuel-air ratio correction command signal.

2. A control system for a gas turbine power plant, the gas turbine power plant including:

a compressor (1) that compresses combustion air;

a water atomization cooling apparatus (3) that sprays water drops of atomized water supplied via a water atomization flow rate regulating valve (13) over a flow of air drawn in the compressor (1);

a combustor (2) that includes a plurality of burners and fuel supply systems that supply fuel to each of the corresponding burners; mixes the compressed combustion air with fuel to thereby burn a fuel-air mixture and generate combustion gas at high temperature; and performs combustion switching which add the fuel supply systems that supply systems to be used for distributing the fuel flow rate as the total fuel flow rate increases;

a turbine (4) that uses the combustion gas to drive the compressor (1) and a generator;

a fuel flow meter (52) that measures a flow rate of fuel supplied to the combustor (2);

an air flow meter (51) that measures a flow rate of air drawn in the compressor (1);

a water atomization flow meter (53) that measures a flow rate of the atomized water supplied to the water atomization cooling apparatus (3);

an atmospheric condition detector (54) that measures, at least one of atmospheric temperature, humidity, and pressure; and the water atomization flow rate regulating valve (13) that controls the flow rate of the atomized water, the control system comprising:

a fuel flow rate control circuit (22) that calculates a fuel flow rate command value (32) to be applied to the combustor (2);

an air flow rate control circuit (21) that calculates an air flow rate command value (31) to be applied to the compressor (1); and a water atomization flow rate control circuit (23) that reads the fuel flow rate command value (32), the air flow rate command value (31), and values measured by the air flow meter (51), the fuel flow meter (52), the water atomization flow meter (53), and the atmospheric condition detector (54); calculates a water atomization flow rate correction command value that compensates in advance for reduction in a fuel-air ratio occurring at the combustor (2) during the combustion switching and time of day at which to start control by the water atomization flow rate correction command value; starts the water atomization cooling apparatus (3) before the combustion switching occurs; and controls an opening amount of the water atomization flow rate regulating valve (13) based on a water atomization flow rate command value (33) that incorporates the water atomization flow rate correction command value starting with the control start time of day.

3. A control system for a gas turbine power plant, the gas turbine power plant including:

a compressor (1) that compresses combustion air;

a water atomization cooling apparatus (3) that sprays water drops of atomized water over a flow of air drawn in the compressor (1);

a combustor (2) that includes a plurality of burners and fuel supply systems that supply fuel to each of the corresponding burners; mixes the compressed combustion air with fuel to thereby burn a fuel-air mixture and generate combustion gas at high temperature and performs combustion switching which add the fuel supply systems to be used for distributing the fuel flow rate as the total fuel flow rate increases;

a turbine (4) that uses the combustion gas to drive the compressor (1) and a generator;

a fuel flow meter (52) that measures a flow rate of fuel supplied to the combustor (2);

an air flow meter (51) that measures a flow rate of air drawn in the compressor (1);

a water atomization flow meter (53) that measures a flow rate of the atomized water supplied to the water atomization cooling apparatus (3);

an atmospheric condition detector (54) that measures, at least one of atmospheric temperature, humidity, and pressure; and a compressor inlet inner blade (11) that controls the flow rate of air drawn in the compressor (1), the control system comprising:

a fuel flow rate control circuit (22) that calculates a fuel flow rate command value (32) to be applied to the combustor (2);

a water atomization flow rate control circuit (23) that calculates a water atomization flow rate command value (33) to be applied to the water atomization cooling apparatus (3); and an air flow rate control circuit (21) that reads the fuel flow rate command value (32), the water atomization flow rate command value (32), the water atomization flow rate command value (33), and values measured by the air flow meter (51), the fuel flow meter (52), the water atomization flow meter (53), and the atmospheric condition detector (54); calculates an air flow rate correction command value that compensates in advance for reduction in a fuel-air ratio occurring at the combustor (2) during the combustion switching and time of day at which to start control by the air flow rate correction command value; starts the water atomization cooling apparatus (3) before the combustion switching occurs; and controls an opening amount of the compressor inlet inner blade (11) based on an air flow rate command value (31) that incorporates the air flow rate correction command value starting with the control start time of day.

4. A control system for a gas turbine power plant, the gas turbine power plant including:

a compressor (1) that compresses combustion air;

a water atomization cooling apparatus (3) that sprays water drops of atomized water supplied via a water atomization flow rate regulating valve (13) over a flow of air drawn in the compressor (1);

a combustor (2) that includes a plurality of burners and fuel supply systems that supply fuel to each of the corresponding burners; mixes the compressed combustion air with fuel to thereby burn a fuel-air mixture and generate combustion gas at high temperature and performs combustion switching which add the fuel supply systems to be used for distributing the fuel flow rate as the total fuel flow rate increases;

a turbine (4) that uses the combustion gas to drive the compressor (1) and a generator;

a fuel flow meter (52) that measures a flow rate of fuel supplied to the combustor (2);

an air flow meter (51) that measures a flow rate of air drawn in the compressor (1);

a water atomization flow meter (53) that measures a flow rate of the atomized water supplied to the water atomization cooling apparatus (3);

an atmospheric condition detector (54) that measures, at least one of atmospheric temperature, humidity, and pressure;

the water atomization flow rate regulating valve (13) that controls the flow rate of the atomized water; and a compressor inlet inner blade (11) that controls the flow rate of air drawn in the compressor (1), the control system comprising:

a fuel flow rate control circuit (22) that calculates a fuel flow rate command value (32) to be applied to the combustor (2);

an air flow rate control circuit (21) that calculates an air flow rate command value (31) to be applied to the compressor (1); and a water atomization flow rate control circuit (23) that reads the fuel flow rate command value (32), the air flow rate command value (31), and values measured by the air flow meter (51), the fuel flow meter (52), the water atomization flow meter (53), and the atmospheric condition detector (54); calculates a water atomization flow rate correction command value that compensates in advance for reduction in a fuel-air ratio occurring at the combustor (2) during the combustion switching and time of day at which to start control by the water atomization flow rate correction command value; starts the water atomization cooling apparatus (3) before the combustion switching occurs; and controls an opening amount of the water atomization flow rate regulating valve (13) based on a water atomization flow rate command value (33) that incorporates the water atomization flow rate correction command value starting with the control start time of day, wherein the air flow rate control circuit (21) reads the fuel flow rate command value (32), the water atomization flow rate command value (33), and values measured by the air flow meter (51), the fuel flow meter (52), the water atomization flow meter (53), and the atmospheric condition detector (54), the fuel flow rate command value (32), and the water atomization flow rate command value (33); calculates an air flow rate correction command value that compensates in advance for reduction in the fuel-air ratio occurring at the combustor (2) during the combustion switching and time of day at which to start control by the air flow rate correction command value; and controls an opening amount of the compressor inlet inner blade (11) based on the air flow rate command value (31) that incorporates the air flow rate correction command value starting with the control start time of day.

* * * * *